United States Patent
Guilhem

[11] Patent Number: 5,176,777
[45] Date of Patent: Jan. 5, 1993

[54] PROCESS AND APPARATUS FOR COVERING AN OBJECT WITH AT LEAST ONE PIECE OF FLEXIBLE MATERIAL

[76] Inventor: Christian Guilhem, Route National 20, 82350 Albias, France

[21] Appl. No.: 635,563
[22] PCT Filed: Jun. 16, 1989
[86] PCT No.: PCT/FR89/00306
 § 371 Date: Jan. 14, 1991
 § 102(e) Date: Jan. 14, 1991
[87] PCT Pub. No.: WO90/00519
 PCT Pub. Date: Jan. 25, 1990

[30] Foreign Application Priority Data

Jul. 13, 1988 [FR] France .................. 88 09763
Jun. 14, 1989 [CA] Canada .................. 602729

[51] Int. Cl.⁵ ............................................. B28B 3/02
[52] U.S. Cl. .................................. 156/245; 156/285;
 156/583.3; 156/583.8; 156/583.9; 264/225;
 264/314; 264/570; 425/387.1; 425/388;
 425/389; 425/405.1; 425/405.2; 100/295;
 100/296; 100/297
[58] Field of Search ............. 425/DIG. 20, 387.1,
 425/388, 389, 405.1, 405.2; 156/245, 285, 583.3,
 583.8, 583.9; 264/225, 314, 570; 100/295, 296,
 297

[56] References Cited

U.S. PATENT DOCUMENTS

| | | | |
|---|---|---|---|
| 2,268,262 | 12/1941 | Miller | 156/583.3 |
| 2,517,902 | 8/1950 | Luebkeman | 264/314 |
| 4,828,639 | 5/1989 | Aker et al. | 156/285 |
| 4,921,561 | 5/1990 | Kinugasa et al. | 156/285 |

FOREIGN PATENT DOCUMENTS

884920 12/1961 United Kingdom ............ 156/583.8

Primary Examiner—Caleb Weston
Attorney, Agent, or Firm—Harold H. Dutton

[57] ABSTRACT

In a process for covering an object by means of at least one flexible piece, a fluidized bed of particles (8) is covered by a flexible cloth (10), the flexible covering piece (12) is placed above said cloth, the object (13, 14) is placed above said cloth, pressure is applied to said object, deforming the flexible sheet and immersing the object in the fluidized bed until a mating imprint is formed in the latter. The covering can be effected by gluing, in particular with a previously applied heat-activated adhesive in which case the fluidized bed is obtained by means of a current of hot air at a temperature above the activation temperature of the adhesive. The process is particularly suitable for assembling and mounting seat covers. Also described is a device for implementing the process.

13 Claims, 5 Drawing Sheets

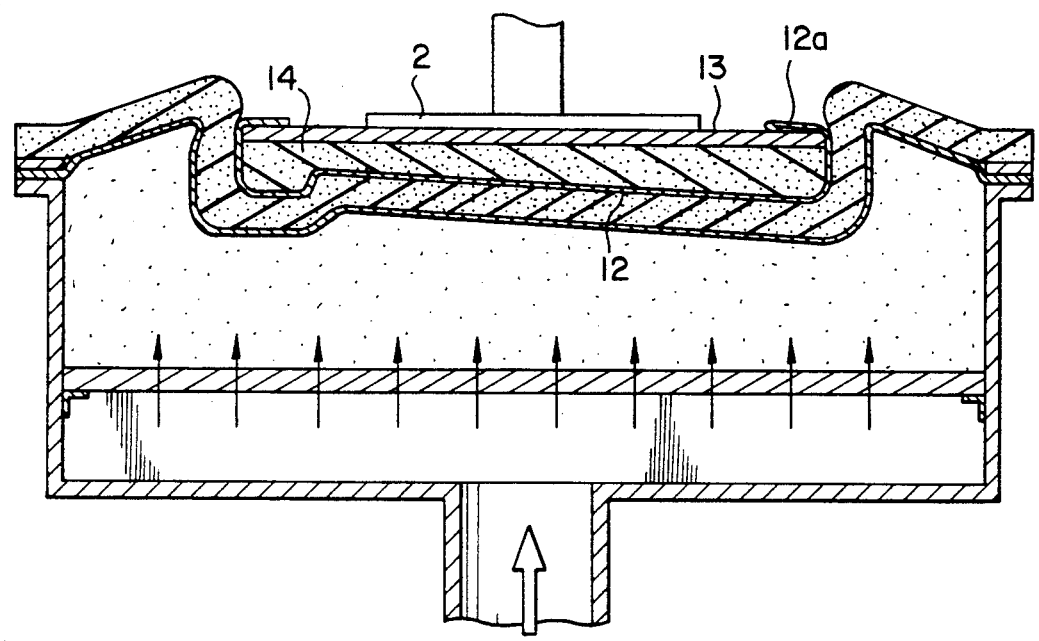
F I G. 6
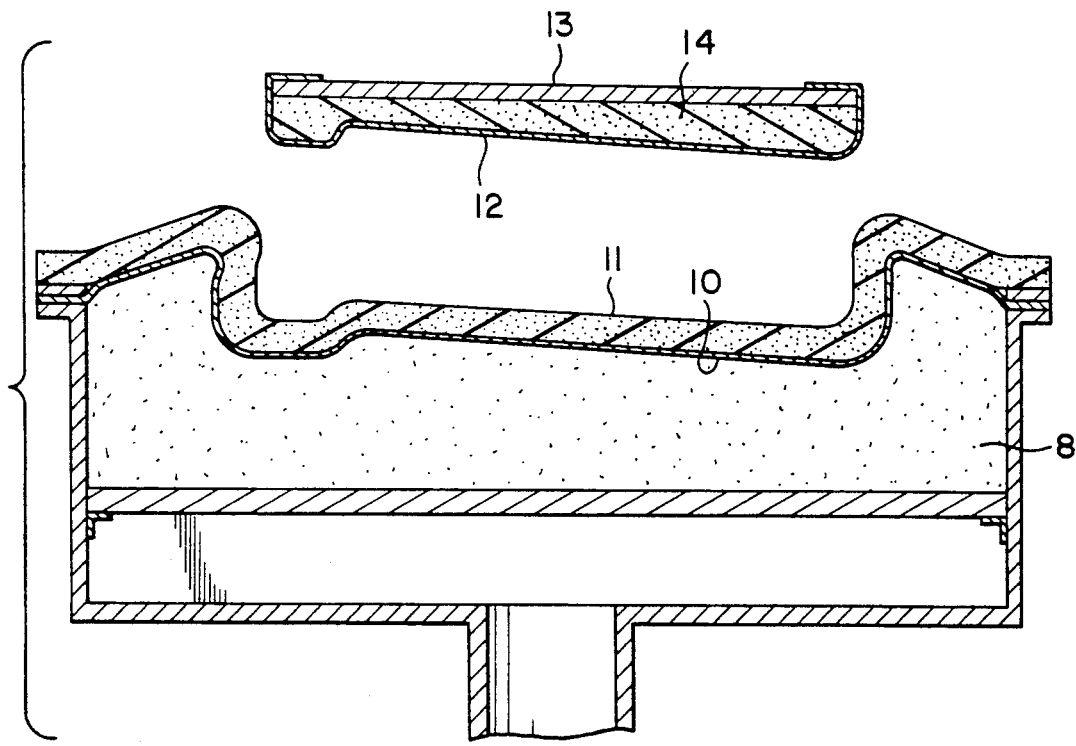
F I G. 7

PROCESS AND APPARATUS FOR COVERING AN OBJECT WITH AT LEAST ONE PIECE OF FLEXIBLE MATERIAL

The invention relates to a process and apparatus for covering an object with at least one piece of flexible or supple material. It is applicable, in particular, to making seat upholsteries that consist of a rigid support, a resilient foam layer and a fabric cover.

BACKGROUND AND OBJECTS OF THE INVENTION

When an object needs to be covered with a piece of flexible material that is to hug its contours, it is generally maintained by means of holding forms adjusted to the object to be covered. This is the case, for instance, in the European patent application No. 0 223 312 that describes the covering of a seat cushion. The primary drawback of the holding forms resides in their characteristic features designed specifically for an object of given sizes and shapes. The manufacturer needs as many forms as there are types of objects to be covered. Furthermore, there are mechanical holding processes, but the latter require generally long setting-up periods and they are ill-suited for automation and cannot be used in cases of complete covering of the object concerned, considering the absence of areas suitable for gripping the latter.

DESCRIPTION OF THE INVENTION

This invention seeks to provide a new process for covering and object and to provide a device for its implementation in order to remedy the drawbacks of known covering processes.

The process according to the invention allows the covering of an object with a flexible piece of fabric material and comprises:
- providing a fluidized bed of particles covered with a flexible cloth,
- placing the flexible piece of fabric material on top of the cloth that covers the moving bed,
- placing the object on the piece of flexible fabric material,
- applying pressure to the object in such a manner as to deform the cloth and the flexible material and to drive the object into the moving bed until an imprint has been made, with the flexible piece of material fitting the forms of the object and hugging the latter,
- and fastening the flexible piece of fabric material to the object.

Fastening the piece of supple material to the object may be carried out while the bed is maintained in fluidized condition and by applying permanent pressure to the object. It is also possible, after the sinking of the object into the moving bed, to stop the fluidization of the particles (by shutting off the gas flow that brings about this fluidization) and, once the particles are immobilized one against the other, to remove the pressure on the object which is then held in the imprint made in the bed (that has become a fixed bed). If need be and after the fluidization has been stopped, the bed can be subjected to suction for the purpose of locking the particles in place, one in relation to the other.

In cases where a series of identical objects has to be covered, it will be possible to repeat the first method for each of these objects. It is also possible to carry out the covering of the first object by using the second method of implementation, by removing this first object while maintaining the bed in fixed condition and by then placing each following object and its flexible piece of material inside the imprint made in the fixed bed by the first object, with a view to fastening this flexible piece of fabric material to the object.

The process according to the invention allows for covering objects of any form without having to first make, by molding or machining, a holding form for each type of object. Such a process is particularly attractive where the covering has to be made on objects likely to display numerous different shapes or sizes.

It should be noted that fastening the piece of flexible material can be carried out in accordance with European patent application No. 0 223 312, by means of a tension string placed around this flexible piece of material, which is tightened at the end of the operation for the purpose of pleating and tightening the edges of this material around the object.

This fastening can also be carried out by any other process, such as by stapling to the back of the object, by gluing, etc. Gluing the piece of material to the forms of the object may be combined with the process of the aforesaid application (that allows for tightening the edges of this material at the back of the object).

The invention extends to a special method of fastening that comprises providing for gluing by means of a thermally activated glue, with the latter being activated by the fluidizing gas flow heated to a temperature level above the activation temperature level of the glue.

The object destined to be covered may consist of several parts that have to be assembled, in particular a rigid support and a foam layer in the case of a seat cushion. The process according to the invention with gluing by means of a thermo-activated glue will allow for carrying out the covering and the assembling by gluing in one operation, by way of the hot fluidizing gas flow that ensures that the glue is activated.

The invention extends to a device for covering an object with at least one piece of flexible fabric material. This device comprises, in combination:
- an enclosure open at its top side and fitted in its lower section with a gas supply system and with a distributor covered by a bed of particles, for the purpose of fluidizing this bed,
- a flexible fabric arranged on top of the bed of particles and fastened to the enclosure on its periphery in such a manner as to enable it to undergo deformations,
- a compressing unit situated opposite the open side of the casing and designed so as to enable it to be subjected to a relative movement that moves it away from or closer to said enclosure,
- means for relatively shifting the compressor unit in relation to the casing.

DESCRIPTION OF THE DRAWINGS

Other characteristic features, objects and advantages of the invention will become apparent from the following description in reference to the appended drawings which present methods of embodiment of the device according to the invention; in these drawings:

FIGS. 3, 4, 5, 6 and 7 illustrate the stages of the covering process.

DETAILED DESCRIPTION OF PREFERRED EMBODIMENTS

Figure 1:
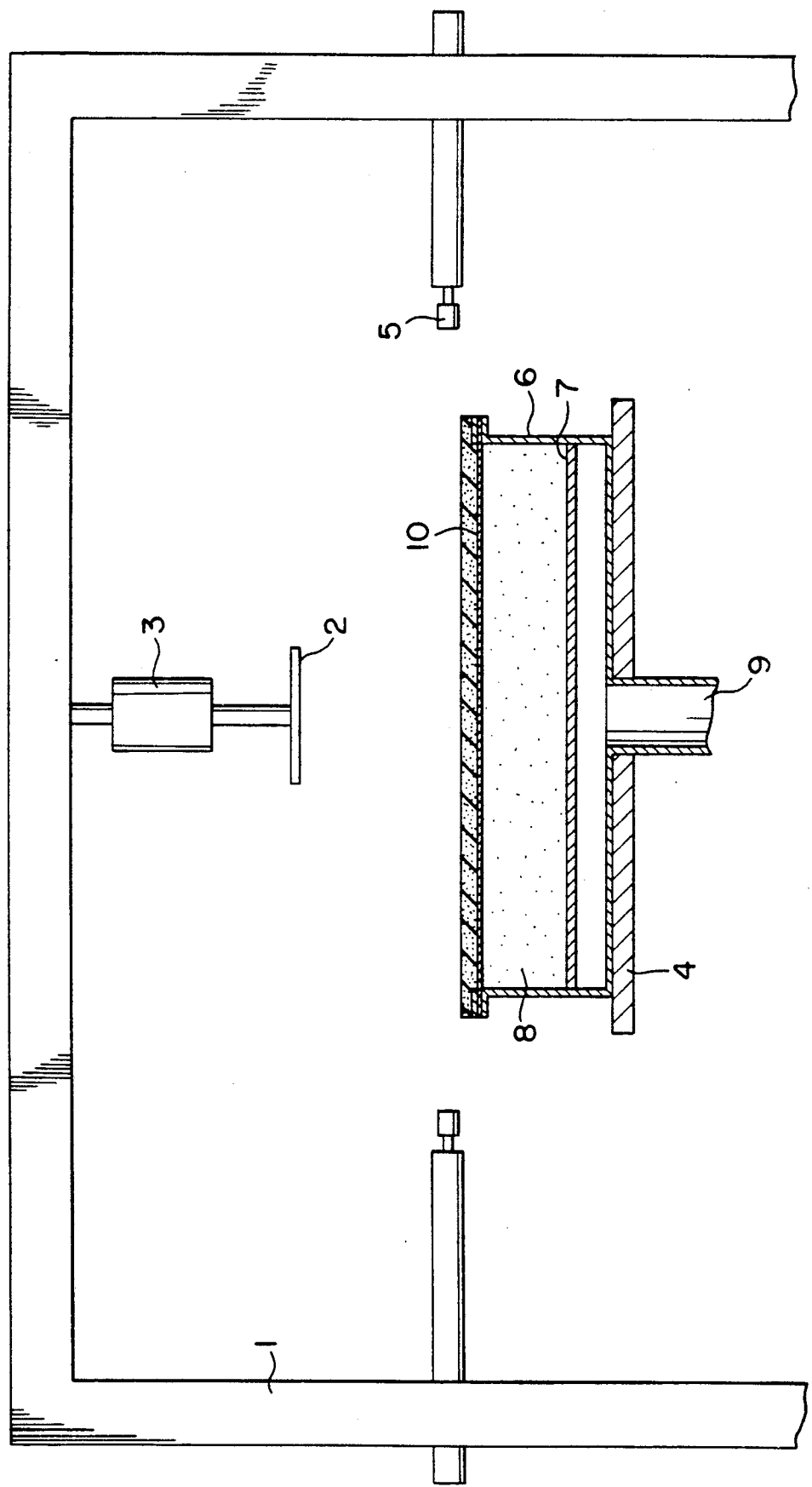
FIG. 1 is a vertical sectional view through an axial plane of this device.
Figure 8:
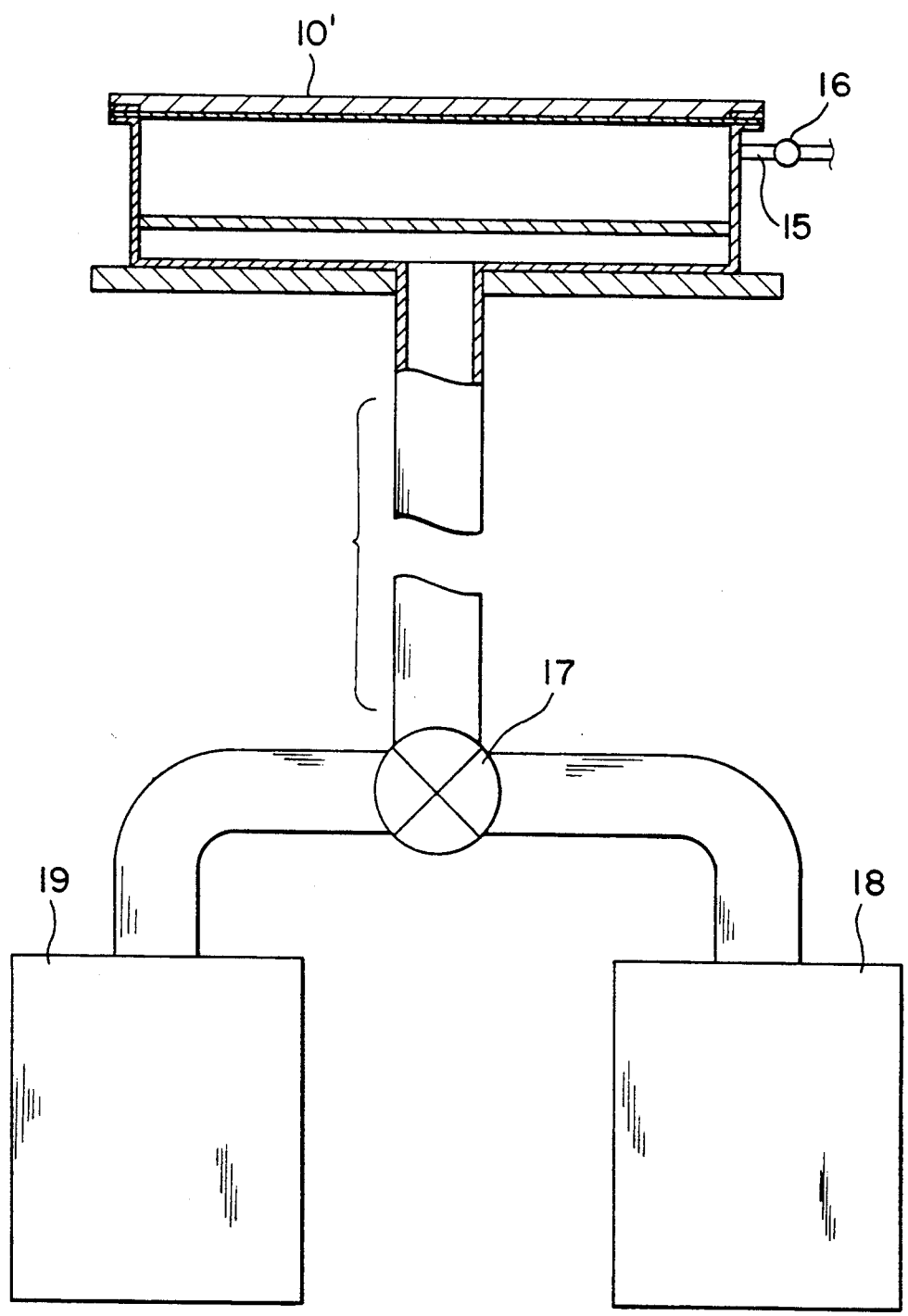
FIG. 8 shows a variation of the device.

The press represented as an example in FIG. 1 is of the type referred to in the FIGS. 8 and 9 of the aforesaid European application n 0 223 312. It is designed for the assembly and covering of a seat upholstery or seat cushion. This press comprises general means already described in this earlier application: frame 1, compressing unit comprising a plate or crossbar 2, jack 3 that carries the compressing unit 2 to enable its vertical displacement, table 4 situated perpendicular to unit 2, claws 5 to provide drawing up the ends of a tension string at the back of the upholstery (this patent application is being referred to for more details on these units and their application).

In accordance with this invention, table 4 supports a casing 6 fitted solidly to this table. This casing is open at its top and comprises in its bottom section a fluidizing distributor 7 that comprises, in the example, a microporous plate made of chipboard. The latter is topped by a bed of particles 8 that comprises a multitude of glass microballs; the distributor 7 can be traversed by a fluidizing air flow that is delivered via the plate 4 and the bottom section of the casing, by an outlet pipe 9.

The glass balls have a granular size that ranges from 75 to 150 micron and a density (specific gravity) comprised between 2.3 and 2.8 (density of 2.5 in the example shown). The pipe 9 is connected to an air supply system (not shown) that is associated with means for heating the flowing air. In the example shown, this supply system and the distributor 7 are designed so as to allow for air distribution into the casing at a linear speed of between 1.5 Vmf and 6 Vmf (at height of the right section of the casing), with Vmf being the minimum glass ball fluidizing speed (in the region of 0.9 m/sec in the example given).

The air heating means may comprise a resistance heater with a power level on the order of 2 kilowatt, with the air blower having an output in the region of 1.5 m$^3$/min at a relative pressure of 60 mb. This air flow can thus be heated to a temperature of 80° C. to 100° C.

In FIG. 1, the bed of particles is assumed to be at rest (in the absence of any air distribution). It is topped by a flexible cloth 10 fitted to the casing at its periphery. This supple cloth is porous so as to let the flow of air pass through while retaining the glass balls. This cloth can be made of fine-meshed woven synthetic material (or it can comprise several aerated sheets combined).

In the example given, the cloth 10 is lined with a layer 11 of open cell hyper-supple foam material capable of hugging the contours of the object applied on top thereof. This foam material helps folding back the edges of the covering.

Figure 2:
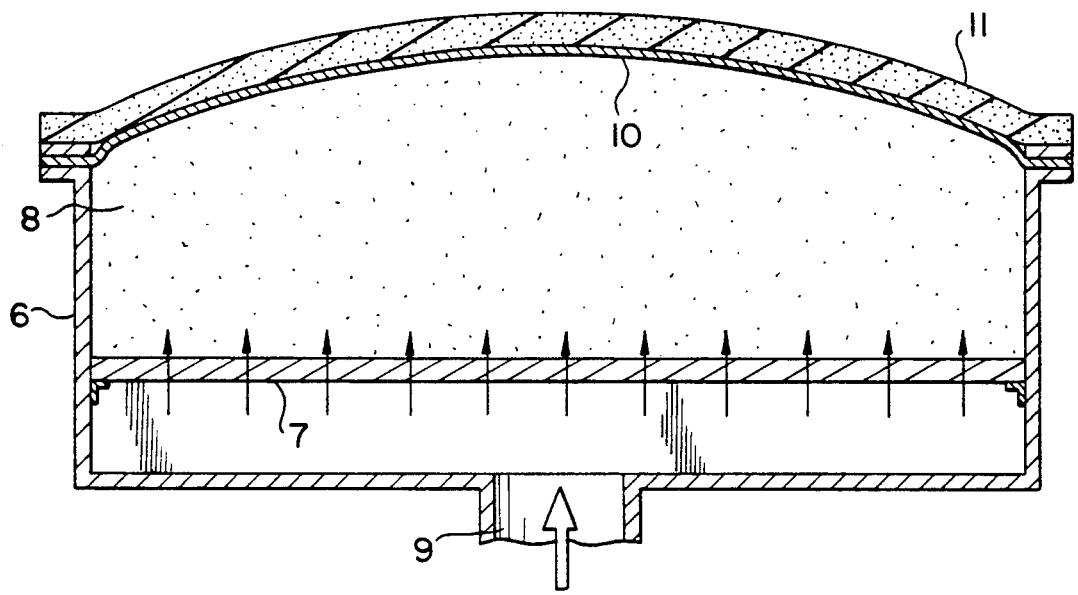
FIG. 2 is a larger scale sectional view showing the bed in fluidized condition.

FIG. 2 shows the bed of balls in fluidized condition when fluidizing air is being supplied through the pipe 9. The bed inflates and displays a behavior equal to that of a liquid bed (but compressible) of an average density of the order of 1.5.

Figure 3:
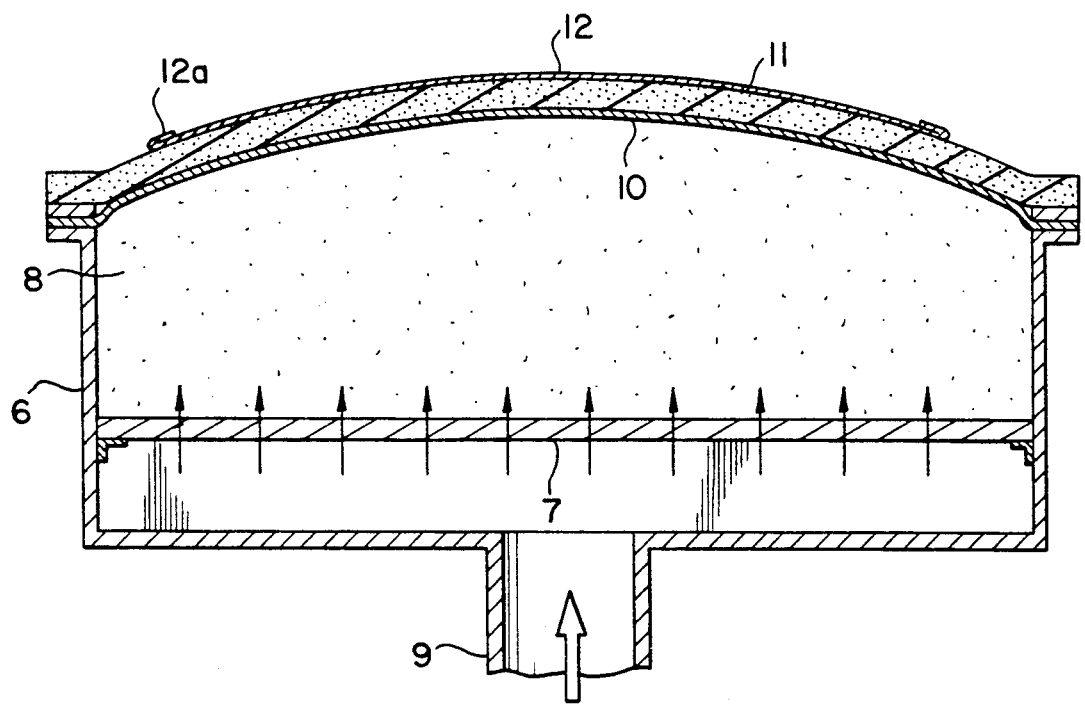

The process according to the invention starts with placing on top of the bed, a fabric 12 intended to cover the seat upholstery (FIG. 3). This fabric is cut to appropriate shape and may be provided at its edge 12a, with a tension string in accordance with application EU 0 223 312.

Figure 4:
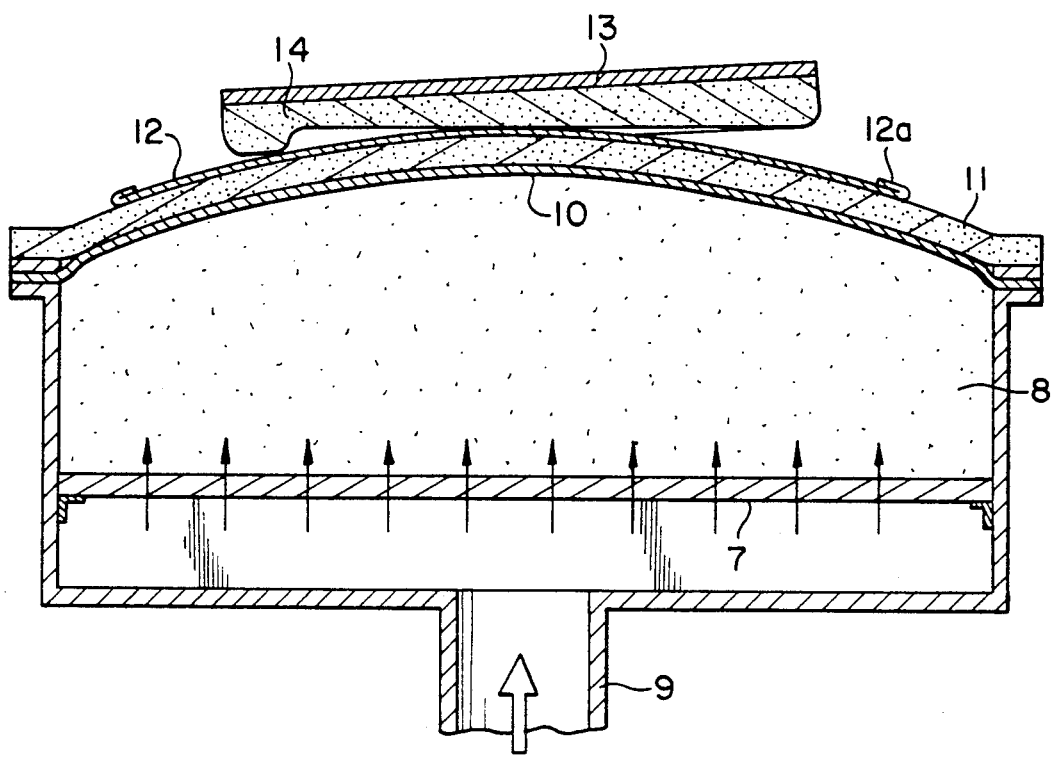

The component parts of the upholstery are then placed on the material 12, in the example shown, the rigid support 13 and the foam layer 14 (FIG. 4). Initially, the opposing faces of the material 12 and the foam 14 and, on the other hand, the foam 14 and the support 13, are coated with glue. For this purpose, a thermo-activated glue that becomes adhesive upon heating to about 65 degrees Celsius is used. This glue may comprise, in particular, a "Chimiprene C-GEX" type polyurethane-based glue.

Figure 5:
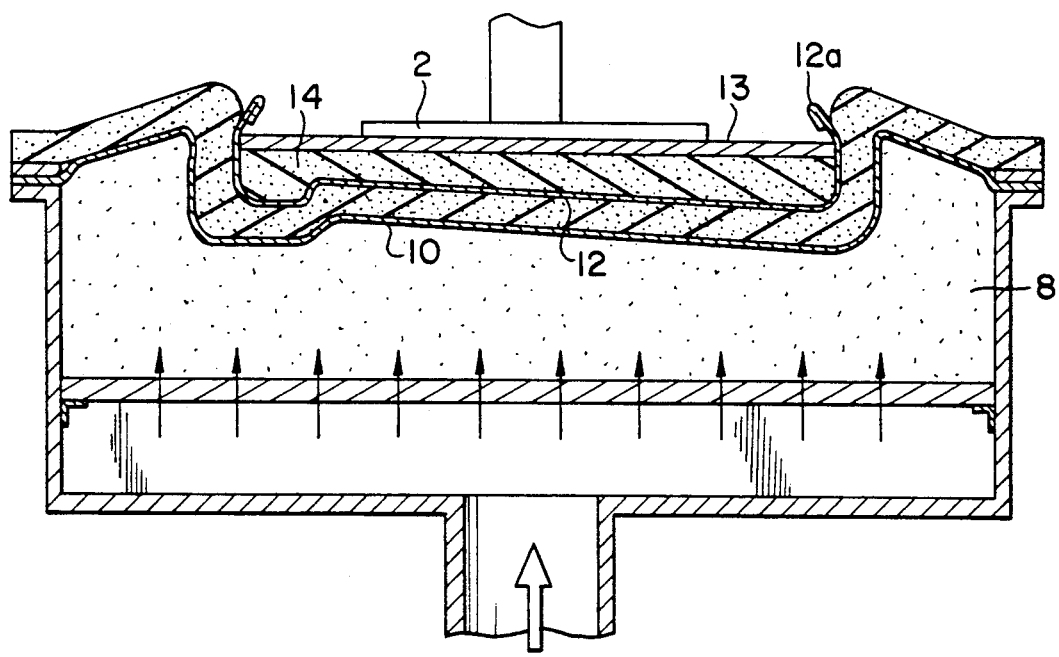

The compressing unit 2 is then displaced vertically so as to drive the assembly into the moving bed as shown by FIG. 5. The sinking height is designed so as to make the cover 12 hug perfectly the shape of the foam 14 and so as to compress the latter slightly in a very uniform manner. In this position, the assembly finds itself solidly positioned.

The resistance heater is turned on and the 80° to 85° C. hot air activates the glue; a heating period of 15 to 30 seconds permits this reactivation to take place.

During this period, the ends of the tension string that run along the edge 12a of the fabric are pulled and locked in position so as to fold back and hold the material 12 at the back of the upholstery (FIG. 6).

The finished object is removed by raising the compressing unit 2 and another object of a different size may then be dealt with immediately.

It will be noted that the air may be shut off, if need be, before removing the object that has just been finished, and in this event, the (now fixed) bed retains the shape of this object as shown by FIG. 7. This variation allows for positioning, if need be, identical objects (in the absence of air supply) in the imprint formed by a first object.

FIG. 8 shows as a variation, a device designed to allow for a perfect locking in place of the balls, one in relation to the other, so as to prevent deformation of this imprint with the aforesaid method of application. The cloth 10' will be airtight in this case, and means 15 for evacuating the gas supplied and provided with a closing valve 16, will be connected to the enclosure so as to enable the air to escape during the air distribution phases (several discharge pipes being provided around the casing in order to ensure symmetrical outflow).

The inlet of the casing can be connected via a valve 17, either to the air supply system 18 or to the suction means 19. After the supply system 18 has been shut off, the valve 16 is closed and the valve 17 is connected to the suction means 19 that is then switched on. The bed of particles is thus subjected to suction which locks the particles in place, one in relation to the other, and allows for an improved imprint of the first object to be made and a more solid preservation of this imprint.

I claim:

1. A process for covering an object with at least one piece of flexible material, characterized in that it comprises:

providing a fluidized bed of particles (8) covered with a flexible cloth (10), placing a piece of flexible fabric (12) on top of the cloth covering the fluidized bed, placing said object (13, 14) on said piece of flexible fabric, applying pressure to said object in such a manner as to deform the cloth and the piece of flexible fabric and to force the object into the fluidized bed until an imprint has been made, with the piece of flexible fabric fitting the contours of said object and hugging the latter, and fastening the piece of flexible fabric to said object.

2. A process as in to claim 1, characterized in keeping said bed in a fluidized state while continuously applying pressure to the object during the entire period in which the piece of flexible fabric is being fastened to this object.

3. A process as in claim 1, stopping the fluidizing after forcing the object into the fluidized bed removing the pressure applied on the object, and maintaining the object in the imprint made in the bed while the piece of flexible fabric is fastened to this object.

4. A process as in claim 3, and including subjecting the bed to a suction for the purpose of securing the particles in place in relation to each other.

5. A process as in claim 3 for covering successively a series of said objects comprising removing said object while keeping the bed in fixed condition and covering successively a series of said objects by placing each successive of said objects and a piece of flexible fabric into the imprint made in the fixed bed by the first of said series of objects for the purpose of fastening said piece of flexible fabric to the object.

6. A process as in claim 1, in which glue is applied to at least one of the opposing faces of the piece of flexible fabric and the object in such a manner as to achieve fastening by gluing after the piece of flexible fabric has been flattened against the object.

7. A process as in claim 6, characterized in preliminarily coating the piece of flexible fabric (12) and/or the object (13, 14) with thermo-activated glue,
- fluidizing the bed by means of a flow of hot air supplied in the lower section of this bed at a temperature that exceeds the glue-activating temperature,
- leaving the object in position until the piece of flexible fabric has been glued to it.

8. A process as in claim 7, where the object is an upholstery cushion comprising a rigid support (13) and a foam layer (14), with this process allowing for assembling said support and said layer and for covering them with a piece of flexible fabric (12) and characterized in that it comprises:
- coating at least one of the opposing faces of the support (13) and of the foam layer (14) with thermo-activated glue,
- placing the piece of flexible fabric (12) on top of the cloth that covers the moving bed, then the foam layer (14) in contact with the piece of flexible fabric (12) and the support (13) in contact with the foam layer (14),
- applying pressure to the support (13) so as to force the assembly into the moving bed while slightly compressing the foam layer (14),
- removing the assembly after the glue has been activated.

9. A device for covering an object, characterized in that it comprises, in combination:
- an enclosure open at the top (6) and fitted in its bottom section with a gas supply system (9) and a distributor (7), topped by a bed of particles (8) for the purpose of fluidizing this bed,
- a flexible cloth (10) placed on top of the bed of particles (8) and fastened to the enclosure on its periphery in such a manner as to be able to undergo deformations,
- a compressing unit (2) facing the open side of the casing (6) and designed so that it can be subjected to a relative movement away from or closer to said casing,
- means (3) for relatively displacing the compressing unit in relation to the casing.

10. A device as in claim 9, and where the bed of particles (8) is a bed of balls of granular size comprising between 75 and 150 micron and of a density comprising between 2.3 and 2.8 with the gas supply system (9) and the distributor (7) so adjusted that they allow for a gas distribution in the casing at a linear speed comprised between 1.5 Vmf and 6 Vmf, where Vmf is the minimum ball fluidization speed.

11. A device as in claim 9, characterized in that the flexible cloth (10) topping the bed of particles (8) is a porous cloth designed to let the air flow through while retaining the balls.

12. A device as in claim 9, characterized in that it comprises air flow heating means.

13. A device as in claim 9 and comprising an airtight cloth (10'), means for discharging (15) the gas distributed, and suction means (19) linked to the enclosure for allowing the bed of particles to be subjected to suction.

* * * * *